(12) United States Patent
Abeln et al.

(10) Patent No.: US 6,477,175 B1
(45) Date of Patent: Nov. 5, 2002

(54) METHOD AND APPARATUS FOR TRANSFERRING INFORMATION FROM AN INFORMATION SOURCE TO INFORMATION RECEIVERS

(75) Inventors: Thomas Abeln, Zürich; Matthias Keller, Schwerzenbach; Peter Lietha, Fischbach-Göslikon; Stefan Schwarz, Adliswil, all of (CH); Peter Giese, Zorneding (DE)

(73) Assignee: Siemens Schweiz, Zurich (CH)

( * ) Notice: Subject to any disclaimer, the term of this patent is extended or adjusted under 35 U.S.C. 154(b) by 0 days.

(21) Appl. No.: 09/142,826

(22) PCT Filed: Mar. 11, 1997

(86) PCT No.: PCT/CH97/00098

§ 371 (c)(1),
(2), (4) Date: Sep. 15, 1998

(87) PCT Pub. No.: WO97/35446

PCT Pub. Date: Sep. 25, 1997

(30) Foreign Application Priority Data

Mar. 20, 1996 (CH) .............................. 0729/96

(51) Int. Cl.⁷ .......................... H04M 11/04; H04J 3/12
(52) U.S. Cl. .......................... 370/432; 379/49; 379/51
(58) Field of Search ................................. 370/432, 420, 370/419, 274, 279, 315, 390, 522; 379/167.13, 187, 37, 39–41, 48–49, 51, 196–197, 199, 202.01

(56) References Cited

U.S. PATENT DOCUMENTS 5,475,687 A * 12/1995 Markkula, Jr. et al. ..... 370/419

* cited by examiner

Primary Examiner—Wellington Chin
Assistant Examiner—Maikhanh Tran
(74) Attorney, Agent, or Firm—Laurence A. Greenberg; Werner H. Stemer; Ralph E. Locher

(57) ABSTRACT

Method and apparatus for supplying the receivers with information in successive steps. The source supplies the first receiver with the information in a first step and supplies a second receiver in a second step whilst the first receiver simultaneously supplies the information to a third receiver.

In further steps the source and already supplied receivers each supply a further receiver with the information until all receivers to be supplied have received the information.

ADVANTAGE—Enables transfer of large quantities of program code and data from central station to several interconnected decentral stations, in very short time and with optimal use of transmission capacity.

10 Claims, 1 Drawing Sheet

METHOD AND APPARATUS FOR TRANSFERRING INFORMATION FROM AN INFORMATION SOURCE TO INFORMATION RECEIVERS

BACKGROUND OF THE INVENTION

1. Field of the Invention

The present invention relates to a method and apparatus for the transfer of information from an information source to information receivers, and more particularly, to a method and apparatus for the transfer of information from an information source to information receivers that can be connected to each other and to a central information source.

2. Discussion of Background Information

In today's complex communications and data-engineering systems, an increasing range of functions is becoming peripheral. Examples of this trend are modem communications systems with more and more intelligent terminals. These terminals exhibit numerous performance features and auxiliary means (e.g. monitors) that allow the user to easily make use of a wide variety of functions. Another result of the shift of intelligence into the periphery is that, with a central system units failure, the entire system does not fail, but rather, only a reduction in its performance capacity is an unavoidable effect.

Modem, intelligent telecommunications terminals are program-controlled and equipped with at least one processor that communicates with central units of the communications system. A thousand or more terminals can be connected to large systems, whereby programs and data necessary for handling communications functions are stored in each terminal. Often, large quantities of program code and data are at issue. In the course of the refinement of the system, or because of operator-specific changes in configuration, program code and/or data in the terminals must be completely or partially updated. In the updating of the terminals, it is advantageous if the terminals can be executed from a single, central location (program memory, database) simultaneously with operation, in other words, without having to interrupt the system operation, and thereby if the existing system infrastructure can be used with as few changes as possible. Moreover, the updating should require as little time as possible, so that the readiness of the system for operation is impaired for only a short time—if at all.

The time factor is most significant when a large number of terminals with large quantities of code and data must be updated. A common problem is then a transfer capacity between the central location and the terminals to be updated that is inadequate for the temporal requirements.

This problem does not only occur, as explained above, in telecommunications applications. It is a fundamental problem in any sort of complex systems in which a number of peripheral units must be updated in terms of data from a central location. This is also the case, for example, in large data-processing systems and data networks.

SUMMARY OF THE INVENTION

It is therefore the task of the present invention to disclose a method that permits the transfer of large quantities of program code and data (hereinafter also referred to simply as "information") in a system from a central location to many peripheral locations of the system and in the shortest possible time and thereby optimally utilizing the available transfer capacity.

This task is accomplished by the present invention of claim 1. Advantageous embodiments and an application of the invention are disclosed herein.

The distribution of information in accordance with the invention occurs in a sort of chain reaction that is triggered from a central location of the system and then involves all of the peripheral system locations to be supplied with new information in consecutive steps. Thus, large quantities of identical information can be transferred quickly to numerous peripheral locations. Further advantages of the method become apparent from the following description of an embodiment.

BRIEF DESCRIPTION OF THE DRAWINGS

The invention is described in detail by way of an example, with reference to the drawings. Shown are thereby.

DETAILED DESCRIPTION OF THE PRESENT INVENTION

Figure 1:
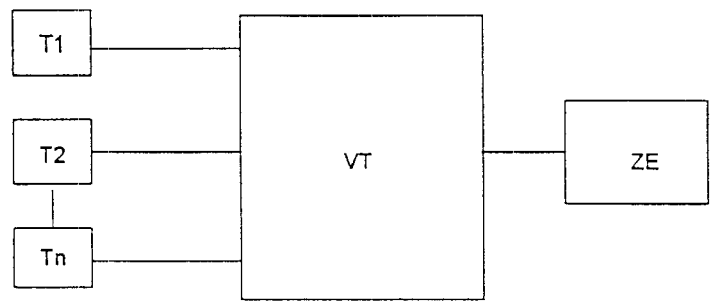
FIG. 1 the principle design of a system in which the invention can be used.

The system in FIG. 1 has a central unit ZE, a switching part VT, and several peripheral units T1, T2, . . . Tn. The system operator can configure the system from the central unit ZE. In particular, the peripheral units T can be configured from the central unit as needed. For this purpose, the central unit ZE can be connected to the relevant peripheral units T1, T2, . . . Tn by way of the switching part VT. The peripheral units T1, T2, . . . Tn can also be arbitrarily connected to one another by way of the switching part VT.

Figure 2:
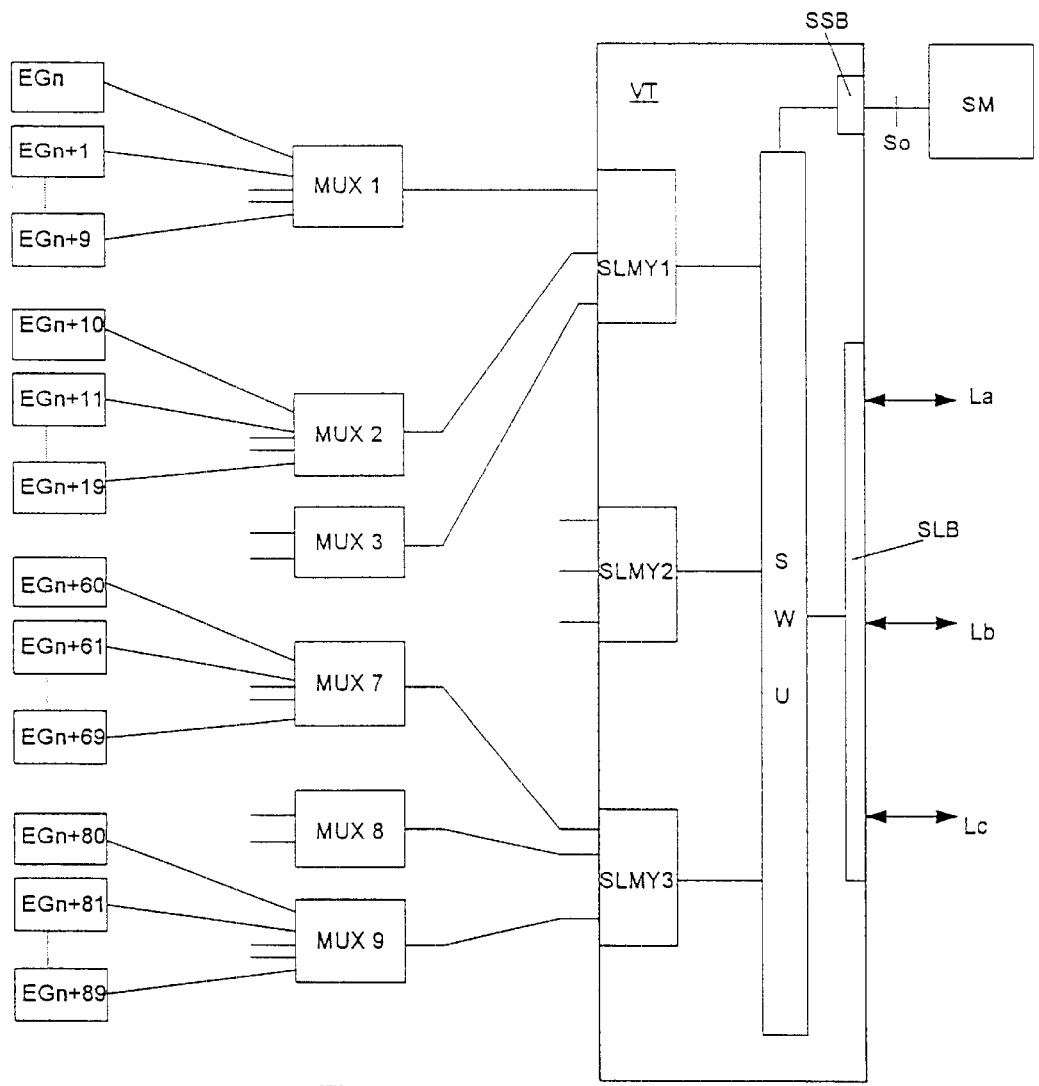
FIG. 2 the structure of a communications system in which the invention can be used especially advantageously.

As shown in FIG. 2, a digital communications system designed in accordance with this principle has a switching part VT and several terminals EG, which are connected to the switching part VT. In addition, a system manager SM is connected to the switching part VT by way of an So interface (having two B-channels at 64 kbits/s and one D-channel at 16 kbits/s). A computer (e.g., personal computer) having a large storage capacity and a monitor can be used as the system manager SM.

The switching part VT has a switching network SWU, to which the switching groups SLMY1 . . . SLMY3 are connected. Each switching group SLMY is connected, on the one hand, to the switching network SWU by way of an 8-Mbit line and, on the other hand, to three multiplexers MUX, respectively by way of an 8-Mbit line. The switching group SLMY exhibits a coupler for connecting the voice and signaling channels (time slots) originating from the switching network SWU to the multiplexers. ten terminals EG are respectively connected to each multiplexer MUX by way of a 2-Mbit line. The multiplexers MUX have a coupler that connects the voice and signaling channels of the 8-Mbit line originating from the switching groups SLMY to the corresponding terminals EG. The multiplexers MUX are controlled by the associated switching group SLMY. The switching network SWU is a digital coupler having a control serving to switch through connections. Thus, it is possible to connect arbitrary terminals EG to one another by way of the switching groups SLMY and the switching network SWU and to exchange data and voice information via these connections. Also connected to the switching network SWU, by way of an interface module SLB, are external lines, for example analog or digital lines leading to the public telecommunications network, such as exchange lines La, subscriber lines Lb, and leased lines Lc, so that the terminals EG can also be connected to external locations by way of the switching part VT. The number of switching groups SLMY, multiplexers MUX, and terminals EG illustrated in the drawing should be regarded as an example serving to explain the present invention; of course, a different configuration of the communications system is also conceivable.

The terminals EG form the interface between the users and the communications system and offer the user a number of more or less comfort-oriented performance features, depending on the application. In an embodiment of the communications device, which is used for currency exchange in banks, the terminals EG have a keyboard with a program-controlled LCD (liquid crystal display) soft key, for example for different inputs and outputs (e.g. selection of destinations). Furthermore, a monitor having user instructions, and hands-free speaking and listening functions, can be provided. To perform all of these functions, each terminal EG uses its own processor, which controls the relevant functions by means of software stored in an associated program or data memory. The software is switching and user software. The switching software controls all of the functions associated with the communication, such as the monitoring and the switching of connections (voice channels) through to the multiplexers MUX and the switching groups SLMY. The user software basically assumes the control of the user surface with the keyboard and the monitor.

As a consequence of refinements or operator-specific changes, it can become necessary to update information (programs and/or data) stored in the terminals EG. To this end, more or less large quantities of information must be transferred to all or only a portion of the connected terminals EG. An update with a relatively small quantity of information to be transferred is, for example, the new inscription of a destination key because the associated line has changed. In the course of refinements of the communications system, however, it can also become necessary to supply all of the terminals EG with new versions of programs. In this case, the terminals EG must be supplied with a comparatively large quantity of new program code and/or data. It must be taken into consideration here that the data-transfer capacity in the communications system is limited, and, despite this, the terminals EG are to be supplied with the new information as fast as possible and with the use of the means present in the communications system.

The system manager SM constitutes the interface between the operator and the system. It is connected to the switching network SWU by way of an So interface and an interface module SSB and has a large database, which contains, among other things, the data and programs for the configuration of the switching groups SLMY and terminals EG.

Different options are conceivable for supplying the terminals EG with updated information from the system manager SM—independently of the quantity of information to be transferred. One option includes supplying the terminals with new information individually, one after the other. In this case, the time required for supplying all of the terminals with new information increases proportionately with the number of terminals, and is correspondingly lengthy for a large number of terminals. The transfer time can be reduced with additional So interfaces between the system manager SM and the switching part VT, but this means an additional switching and control outlay.

Simultaneously supplying all of the terminals EG with new information would be more ideal. This, however, would additionally require a unit in the system that performs the star-shaped distribution of the information, which is transmitted from the system manager SM into the system via the So interface, to the terminals EG. This type of distribution unit, however, also requires an additional switching and control outlay in the system. Moreover, during the information transfer, the switching part VT would be heavily populated by the numerous connections that are connected through during the information transfer and may be unacceptably blocked for connecting through data and voice connections.

The invention shows a way with which the transfer time can be reduced for a multitude of terminals EG without an additional switching outlay, particularly without additional So interfaces. As is yet to be discussed below, the intended reduction is most substantial with a large number of terminals EG and relatively large quantities of information to be transferred. It is assumed hereinafter that all of the terminals EGn, EGn+1, EGn+2, etc. (FIG. 2) connected to the communications system must be loaded with an identical, new program version; that is, they must be supplied with a relatively large quantity (e.g. 5 Mbytes) of new information. It is further assumed that only one So interface is provided between the system manager SM and the communications system, of which only one B channel is available for data transfer, because the other B channel is required for feedback (e.g. interference messages) to the system manager SM. In accordance with the invention, the terminals EG are supplied with new information as follows:

At the system manager SM, the operator (system administrator) initiates the function "supply all terminals with new information." A loading procedure activated by this produces a connection, by way of the switching network SWU, the switching unit SLMY1, and the multiplexer MUX1, from the system manger SM to the first terminal EGn, which is identified by a device number that is known to the system manager SM. A free channel (time slot) is occupied on the connection lines between the switching unit-SLMY1 and the multiplexer MUX1, or between the multiplexer MUX1 and the selected terminal EGn, so the transfer can take place between the system manager SM and the terminal EGn by way of a point-to-point connection, for example using HDLC protocol. As soon as the connection has been produced, the terminal EGn transmits a ready message to the system manager SM, whereupon the transfer of the information to the terminal EGn occurs. After this first step of the loading procedure, a terminal, namely, the terminal EGn, is supplied with the new information.

In a second step, based on the described loading procedure, the system manager SM sets up a connection to the terminal EGn+1 and supplies this with the new information. At the same time, the system manager SM assigns the terminal EGn the task of supplying the terminal EGn+2 with the new information obtained previously in the first step. For this purpose, the terminal EGn sets up data connection, by way of the multiplexer MUX1, the switching unit SLMY1 and the switching network SWU, to the terminal EGn+2, and supplies this with the new information obtained from the system manager SM in the first step. Thus, after the second step, three terminals EG have already obtained the new information. The procedure can be continued with further, identical steps until all of the terminals to be supplied with the new information have obtained the information. The following table gives an overview of I through m steps, whereby the transmitter is the device (SM or EG) that transmits the information, and the receiver is the device (EG) that obtains the information.

TABLE 1

| Step No. | Transmitter | Receiver | No. of Supplied Terminals |
|---|---|---|---|
| 1 | SM | EGn | 1 |
| 2 | SM | EGn + 1 | 3 |
|   | EGn | EGn + 2 |   |
| 3 | SM | EGn + 3 | 7 |
|   | EGn | EGn + 4 |   |
|   | EGn + 1 | EGn + 5 |   |
|   | EGn + 2 | EGn + 6 |   |
| 4 | SM | EGn + 7 | 15 |
|   | EGn | EGn + 8 |   |
|   | ... | ... |   |
|   | ... | ... |   |
|   | EGn + 5 | EGn + 13 |   |
|   | EGn + 6 | EGn + 14 |   |
| 5 |   |   | 31 |
| 6 |   |   | 63 |
| 7 |   |   | 127 |
| 8 |   |   | 255 |
| 9 |   |   | 511 |
| m |   |   | $2^m - 1$ |

Hence, when a single B channel is present between the system manager SM and the switching part VT, after m steps, $2^m - 1$ terminals EG have been supplied with the new information.

To monitor the described "chain reaction," it can be provided that, after each step, the terminals EG receiving the information send a message to the system manager SM to confirm for the system manager SM that the information has been received, that is, successfully transferred. The system manager SM can then be controlled such that the next step of the loading procedure is only initiated once the confirmation has been received from the relevant terminals.

The gain in transfer time achieved with this method represents a concrete example with the following assumptions: a 5-Mbyte quantity of information is to be transferred to each terminal EG, whereby the effective transfer time is 50 kbits/s. Furthermore, a coordination time (the time between the end of one task and the beginning of the next task) of 2 seconds between the system manager SM and a terminal EG is assumed. The time for transferring the entire quantity of information from the system manager SM to a terminal EG, or from one terminal EG to another terminal EG, thus lasts about 800 seconds (5 Mbytes: 50 kbits/s).

If the terminals EG were consecutively supplied with 5 Mbytes of information, with 50 terminals this would result in a transfer time of about 667 minutes (50×800 s), and a transfer time of about 6667 minutes with 500 terminals, which is unacceptable in practice. In contrast, in an information transfer according to the described method, an actual transfer time of about 82 min (6×800 s+50×2 s) results for 50 terminals EG because of the necessary steps (Table 1), and an actual transfer time of about 136 min (9×800 s+500×2 s) results for 500 terminals. The proposed method thus reduces the transfer time considerably.

If a further reduction in the transfer time is intended, the number of steps and therefore the total time required for the transfer of the information can be further reduced through the use of more than one So interface, according to the formula $$N = (2^m - 1) \times b \text{ or } m = \log(N/b + 1)/\log 2$$

(where m=the number of steps, b=the number of available B channels, and N=the number of terminals EG). Of the additionally-used So interfaces, the two B channels should respectively be available for the transfer. With an increasing number of available B channels, the following number of necessary steps results with an increasing number of terminals EG to be updated:

TABLE 2

| No. of EG (N) | No. of So Interfaces | Available B channels | No. of steps (m) |
|---|---|---|---|
| 50 | 1 | 1 | 6 |
| 100 | 2 | 3 | 6 |
| 150 | 3 | 5 | 5 |
| 200 | 4 | 7 | 5 |
| 250 | 5 | 9 | 5 |
| 300 | 6 | 11 | 5 |
| 350 | 7 | 13 | 5 |
| 400 | 8 | 15 | 5 |
| 450 | 9 | 17 | 5 |
| 500 | 10 | 19 | 5 |

Whereas 9 steps (Table I) are required to supply, for example, about 500 terminals with new information in the use of only one B channel, only 5 steps are required in the use of 19 B channels. This means a further, considerable reduction in the total transfer time, which, however, requires an additional switching and control outlay. For 500 terminals, the transfer time is then only about 84 minutes (5×800s+500×2s).

The described method can also be used if only a portion of the terminals connected to the communications system are to be supplied with new information. This requires a correspondingly-programmed loading procedure that effects the transfer of information to selected terminals.

The method can also be used to supply new information to terminals that are not part of a communications system according to FIG. 2 but can be reached from the system by way of the lines La, Lb and Ls.

The use of the method is not limited to communications systems. It can also be used, for example, in a data network constructed according to the principle of FIG. 1, which includes several computers that can be connected among themselves and must be respectively supplied with new data and/or programs from a server.

What is claimed is:

1. A method of transferring information from a central information source to a plurality of information receivers, the information receivers capable of being connected to each other and to the central information source, the central information source successively supplying the information receivers with information in consecutive steps, the method comprising:

supplying information from the central the information source to a first the information receiver;

supplying information from the central the information source to a second the information receiver;

supplying information from the first the information receiver to a third the information receiver simultaneously with said supplying information from the central information source to the second information receiver; and respectively supplying information from information receivers that have already been supplied with information, to an additional information receiver, until all of the information receivers to be supplied with the information have obtained the information.

2. The method of transferring information from a central information source to a plurality of information receivers according to claim 1, further comprising confirming, from each information receiver, to the central information source, that the information has been received, before further information is supplied.

3. A method of transferring information in a telecommunication system, the telecommunication system having at least one central system manager containing the information for operating the telecommunications system, the telecommunications system configured to transfer the information to a plurality of terminals that are connected to the telecommunications system, the terminals being capable of being connected to each other and to the central system manager, and the central system manager successively supplying the terminals with the information in consecutive steps, the method comprising:

supplying the information from the central system manager to a first terminal;

supplying the information from the central system manager to a second terminal;

supplying the information from the first terminal to a third terminal simultaneously with said supplying of the information from the central system manager to the second terminal; and respectively supplying the information from terminals that have already been supplied with the information, to an additional terminal, until all of the terminals to be supplied with information have obtained the information.

4. The method of transferring information from a central information source to a plurality of information receivers according to claim 3, wherein the telecommunications system is a telephone switching system.

5. An apparatus for transferring information from a central information source to a plurality of information receivers, said information receivers capable of being connected to each other and to said central information source, said central information source successively supplying said information receivers with information in consecutive steps, the apparatus comprising:

a first supplier adapted to supply the information from said central the information source to a first the information receiver;

a second supplier adapted to supply the information from said central the information source to a second information receiver; and a third supplier adapted to supply the information from said first the information receiver to a third the information receiver simultaneously with said supplying the information from said central the information source to said second the information receiver; wherein:

at least one of said first, second and third suppliers are adapted to respectively supply the information from the information receivers that have already been supplied with the information, to an additional information receiver, until all of said information receivers to be supplied with the information have obtained the information.

6. The apparatus for transferring information from a central information source to a plurality of information receivers according to claim 5, further comprising a confirmer adapted to confirm, from each information receiver, to said central information source, that the information has been received, before further information is supplied.

7. An apparatus for transferring information in a telecommunication system, said telecommunication system having at least one central system manager containing information for operating said telecommunications system, said telecommunications system being configured to transfer the information to a plurality of terminals that are connected to said telecommunications system, comprising:

a first supplier being adapted to supply the information from said central system manager to a first terminal;

a second supplier being adapted to supply the information from said central system manager to a second terminal;

a third supplier being adapted to supply the information. from said first terminal to a third terminal simultaneously as said central system manager supplies the information to said second terminal.

8. The system for transferring information from a central information source to a plurality of information receivers according to claim 7, wherein said telecommunications system is a telephone switching system.

9. The method according to claims 3, which further comprises:

sending a respective confirmation from each terminal after receiving the information; and waiting for the respective confirmation from the respective terminal before supplying further information to the respective terminal.

10. The apparatus according to claim 7, wherein:

said terminals sending a confirm message to a said central system manager after receiving the information; and said central system manager waits for the confirm message before supplying further information.

* * * * *